(12) United States Patent
Shen et al.

(10) Patent No.: US 11,914,238 B2
(45) Date of Patent: Feb. 27, 2024

(54) FRAME AND DISPLAY DEVICE

(71) Applicant: BOE TECHNOLOGY GROUP CO., LTD., Beijing (CN)

(72) Inventors: Zhiguo Shen, Beijing (CN); Xing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 324 days.

(21) Appl. No.: 17/287,359

(22) PCT Filed: Sep. 24, 2020

(86) PCT No.: PCT/CN2020/117303
§ 371 (c)(1),
(2) Date: Apr. 21, 2021

(87) PCT Pub. No.: WO2021/077978
PCT Pub. Date: Apr. 29, 2021

(65) Prior Publication Data
US 2022/0308384 A1    Sep. 29, 2022

(30) Foreign Application Priority Data

Oct. 24, 2019   (CN) .......................... 201911018506.4

(51) Int. Cl.
*G02F 1/1333*   (2006.01)
(52) U.S. Cl.
CPC .. *G02F 1/133314* (2021.01); *G02F 1/133308* (2013.01); *G02F 1/133317* (2021.01); *G02F 1/13338* (2013.01); *G02F 1/133331* (2021.01)
(58) Field of Classification Search
None
See application file for complete search history.

(56) References Cited

U.S. PATENT DOCUMENTS 6,847,415 B1    1/2005   Yoshimura et al.
9,232,667 B2    1/2016   Cheng et al.
(Continued)

FOREIGN PATENT DOCUMENTS

CN        1758097 A     4/2006
CN      101672999 A     3/2010
(Continued)

OTHER PUBLICATIONS

International Search Report and Written Opinion for International Application No. PCT/CN2020/117303 dated Dec. 29, 2020.
(Continued)

*Primary Examiner* — Richard H Kim
(74) *Attorney, Agent, or Firm* — Perilla Knox & Hildebrandt LLP; Kenneth A. Knox

(57) ABSTRACT

The present disclosure relates to a frame and a display device. The frame includes a frame body having a first end surface and a second end surface disposed oppositely, and the first end surface is used for mounting a first body portion of a first component, and the frame body is provided with a first opening penetrating from the first end surface to the second end surface, and the first opening is used to make a driving circuit board of the first component and a first connecting portion pass, the first connecting portion is used for connecting the first body portion with the drive circuit board, and the second end surface of the frame body is provided with an inclined surface extending outwardly in a direction away from the first end surface from the first opening, and the inclined surface is used for mounting the driving circuit board.

20 Claims, 6 Drawing Sheets

(56) References Cited

U.S. PATENT DOCUMENTS

| | | |
|---|---|---|
| 9,612,467 B2 | 4/2017 | Isami |
| 2014/0253823 A1 | 9/2014 | An et al. |
| 2015/0055316 A1 | 2/2015 | Ye et al. |
| 2015/0116607 A1 | 4/2015 | Cheng et al. |
| 2016/0147098 A1 | 5/2016 | Isami |

FOREIGN PATENT DOCUMENTS

| | | |
|---|---|---|
| CN | 203337944 U | 12/2013 |
| CN | 104424854 A | 3/2015 |
| CN | 104503109 A | 4/2015 |
| CN | 104599593 A | 5/2015 |
| CN | 105579895 A | 5/2016 |
| CN | 105739180 A | 7/2016 |
| CN | 205620644 U | 10/2016 |
| CN | 107145003 A | 9/2017 |
| CN | 108153022 A | 6/2018 |
| CN | 108287426 A | 7/2018 |
| CN | 109239978 A | 1/2019 |
| CN | 109491140 A | 3/2019 |
| CN | 110737124 A | 1/2020 |
| EP | 2840435 A2 | 2/2015 |
| EP | 2840435 A3 | 3/2015 |
| JP | 2000181370 A | 6/2000 |
| JP | 3189304 B2 | 7/2001 |
| KR | 20000047467 A | 7/2000 |
| KR | 100503461 B1 | 7/2005 |

OTHER PUBLICATIONS

First Office Action for CN Patent Application No. 201911018506.4 dated Mar. 2, 2021.

Notice of Allowance for CN Patent Application No. 201911018506.4 dated Aug. 30, 2021.

FRAME AND DISPLAY DEVICE

CROSS-REFERENCE TO RELATED APPLICATION

The present application is a 35 U.S.C. § 371 national phase application based upon International Application No. PCT/CN2020/117303 filed on Sep. 24, 2020, which claims the benefit of and priority to Chinese Patent Application No. 201911018506.4 filed on Oct. 24, 2019, the entire contents of which are hereby incorporated by reference as a part of the present application.

TECHNICAL FIELD

The present disclosure relates to the field of display technologies and, in particular, to a frame and a display device.

BACKGROUND

An electronic product, such as a display device, usually has a display module, a drive circuit, and other components. The drive circuit and the display module are fixed in a frame and are connected with each other through a connecting member, such as a flexible cable (such as chip-on-film (COF), a flexible printed circuit board (FPCB)), etc. The frame is used to provide space for accommodating and protecting respective components, and the frame is usually provided with structures, such as an opening or a groove, to accommodate respective components and the connecting member accordingly.

It should be noted that the information disclosed in the Background section above is only for enhancing the understanding of the background of the present disclosure and thus, may include information that does not constitute prior art known to those of ordinary skill in the art.

SUMMARY

The present disclosure provides a frame.

The present disclosure provides a display device including the above-mentioned frame.

In order to achieve the above objective, an aspect of the present disclosure provides a frame including a frame body, wherein the frame body has a first end surface and a second end surface disposed oppositely, and the first end surface is used for mounting a first body portion of a first component, and the frame body is provided with a first opening penetrating from the first end surface to the second end surface, and the first opening is used to make a driving circuit board of the first component and a first connecting portion pass, the first connecting portion is used for connecting the first body portion with the drive circuit board, and the second end surface of the frame body is provided with an inclined surface extending outwardly in a direction away from the first end surface from the first opening, and the inclined surface is used for mounting the driving circuit board.

In some embodiments, an angle between the inclined surface and a plane where the frame body is located ranges from 10° to 30°.

In some embodiments, the first end surface is provided with a first annular step for mounting the first body portion of the first component, and the first annular step includes a first side wall and a first supporting surface connected to the first side wall and for supporting the first body portion, and the first opening is disposed on the first supporting surface.

In some embodiments, the first end surface is provided with a second annular step for mounting a second body portion of a second component, and the second annular step is disposed around an outside of the first annular step, and includes a second side wall and a second supporting surface connected to the second side wall and for supporting the second body portion, and an inner peripheral edge of the second supporting surface away from the second side wall is connected to an end of the first side wall away from the first supporting surface.

In some embodiments, the first end surface is provided with a third annular step for mounting a third component, the third annular step is disposed around an outside of the second annular step, and includes a third side wall and a third supporting surface connected to the third side wall and for supporting the third component, and an inner peripheral edge of the third supporting surface away from the third side wall is connected to an end of the second side wall away from the second supporting surface.

In some embodiments, the third supporting surface is provided with a groove, and a second opening is disposed at a side of a groove bottom of the groove close to an outer edge of the frame body, and used for a driving board and a second connecting portion of the second component penetrating to the second end surface, and the second connecting portion is used for connecting the second body portion and the driving board, and the second opening is located outside of the inclined surface.

In some embodiments, the second end surface of the frame body is provided with a fourth annular step for mounting an optical assembly of the display device, and the fourth annular step includes a fourth side wall and a fourth supporting surface connected to the fourth side wall and for supporting the optical assembly; the second end surface of the frame body is provided with a fifth annular step for mounting a back plate of the display device, and the fifth annular step is disposed around an outside of the fourth annular step, and includes a fifth side wall and a fifth supporting surface connected to the fifth side wall and for supporting the back plate; an inner peripheral edge of the fifth supporting surface away from the fifth side wall is connected to an end of the fourth side wall away from the fourth supporting surface, and the fifth supporting surface is provided with a first mounting hole for mounting a first fastener to fixedly connecting the back plate to the frame body.

In some embodiments, the second end surface of the frame body is provided with a ring groove for mounting a conductive rubber wire; and/or, the second end surface of the frame body is provided with a second mounting hole for mounting a second fastener to fixedly connecting the frame body to a rear case of the display device.

In some embodiments, the frame body is an integrally formed structure; and/or, the frame body is a rectangular body, and the first opening is disposed on one side of the rectangular body.

A second aspect of the present disclosure provides a display device, including: the frame according to the above; and a first component, wherein the first component includes a first body portion, a driving circuit board, and a first connecting portion connecting the first body portion and the driving circuit board, and the first body portion is mounted at a first end surface of the frame body of the frame, the first connecting portion and the driving circuit board pass through a first opening of the frame body and the driving circuit board is mounted on an inclined surface of the frame body.

In some embodiments, the first component is a liquid crystal screen, the first body portion is a liquid crystal display panel, and the first connecting portion is a flexible cable.

In some embodiments, the first body portion of the first component is mounted at a first annular step disposed on the first end surface.

In some embodiments, the display device further includes a second component mounted at a second annular step disposed on the first end surface on a side of the first component away from a first supporting surface of the first annular step, and the second annular step is disposed around an outside of the first annular step; the second component is a functional sheet of a touch screen.

In some embodiments, the display device further includes a third component mounted at a third annular step disposed on the first end surface on a side of the second component away from the first component, and the third annular step is disposed around an outside of the second annular step; the third component is a cover plate of the touch screen.

In some embodiments, the display device includes: an optical assembly mounted at a fourth annular step disposed on the second end surface of the frame body; and/or, a back plate and a first fastener, wherein the back plate is mounted at a fifth annular step disposed on the second end surface of the frame body, the back plate is provided with a first fixing hole, and a fifth supporting surface of the fifth annular step is provided with a first mounting hole, the first fastener is mounted through the first fixing hole and the first mounting hole.

In some embodiments, the display device includes: a conductive rubber wire mounted in a ring groove disposed on the second end surface of the frame body; and/or, a rear case and a second fastener, wherein the rear case is provided with a second fixing hole, and the second fastener is mounted through the second fixing hole and a second mounting hole disposed on the second end surface of the frame body.

Other features and advantages of the present disclosure will be described in detail in the following specific embodiments. It should be noted that the above general description and the following detailed description are merely exemplary and explanatory and should not be construed as limiting of the disclosure.

This section provides an overview of various implementations or examples of technologies described in the present disclosure, and is not a comprehensive disclosure of the full scope or all features of the disclosed technologies.

BRIEF DESCRIPTION OF THE DRAWINGS

In drawings that are not necessarily drawn to scale, the same reference numerals may describe similar components in different views. The same reference numerals with letter suffixes or different letter suffixes may indicate different examples of similar components. The drawings generally show various embodiments by way of example rather than limitation, and are used together with the specification and the claim to describe the disclosed embodiments. When appropriate, the same reference numerals are used in all drawings to refer to the same or similar parts. Such embodiments are illustrative, and are not intended to be exhaustive or exclusive embodiments of the present device or method.

DETAILED DESCRIPTION

In order to enable those skilled in the art to better understand the technical solutions of the present disclosure, the present disclosure will be described in detail below with reference to the drawings and specific embodiments. The following describes the embodiments of the present disclosure in further detail with reference to the drawings and specific embodiments, but it is not intended to limit the present disclosure.

The use of "first", "second" and similar words in this disclosure is not intended to indicate any order, quantity, or importance, but rather is used to distinguish one element from another. The word "include", "contain", or the like means that the elements preceding the word encompass the elements listed after the word and do not exclude the possibility that other elements are also encompassed. "Upper", "lower", "left", "right", and the like are used only to indicate relative position relations, and when an absolute position of the object being described is changed, the relative position relations may also be changed accordingly.

In the present disclosure, when a specific device is described as being positioned between a first device and a second device, there may or may not be an intervening device between the specific device and the first device or the second device. When the specific device is described as being connected to another device, and the specific device may be directly connected to the other device without the intervening device, or may not be directly connected to the other device but with the intervening device.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be interpreted to have meanings consistent with their meaning in the relevant field and/or context of this specification, and will not be interpreted in an idealized or overly formal sense, unless explicitly so defined in this context.

The technologies, methods, and apparatuses known to those skilled in the related fields may not be discussed in detail, but where appropriate, the techniques, methods and apparatuses should be considered as part of the specification.

Figure 1:
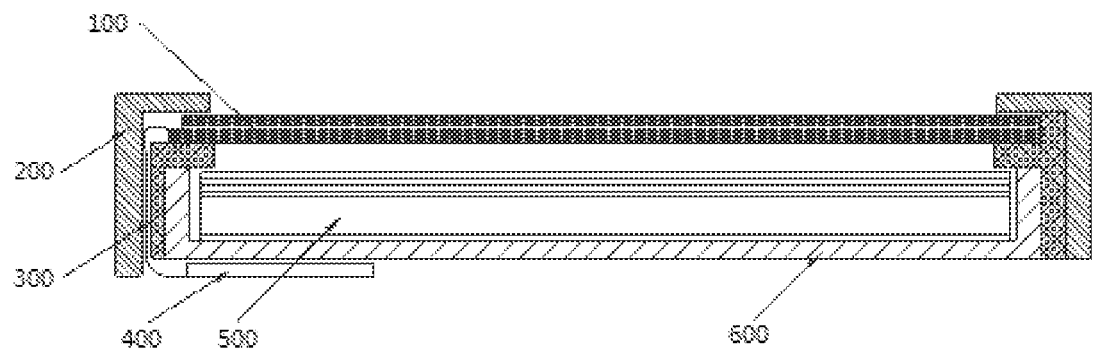
FIG. 1 is a cross-sectional view of a partial structure of a display according to a comparative embodiment of the present disclosure.

FIG. 1 shows a cross-sectional view of a partial structure of a display according to a comparative embodiment of the present disclosure. As shown in FIG. 1, a conventional liquid crystal display may be generally composed of six parts, namely, a liquid crystal screen 100, a front frame 200, a middle frame 300, a driver circuit and flexible cable 400, an optical assembly 500 (including an optical film, a light guiding plate, a LED light bar, etc.), and a back plate 600. The front frame 200 and the middle frame 300 are typically separated, and the driving circuit board is turned over to a back of the back plate 600 through a flexible cable, which is not conducive to reducing a thickness of the product. Alternatively, in another display, the driving circuit board and the back plate are disposed on a same plane, which is not conducive to reducing a length of the product. That is to say, the above two solutions lead to a large product size. In addition, since the driving circuit board is typically disposed parallel to the back plate, and as a result, it is inconvenient for the plugging and unplugging operations of other components with the connectors on the drive circuit board.

Hereinafter, some embodiments according to the present disclosure will be described with reference to FIGS. 2 to 10. The frame body 1 has a side away from a center of the frame body 1 and a side close to a center of the frame body 1. An outside of the frame body 1 refers to the side of the frame body 1 away from the center of the frame body 1, and an inner side of the frame body 1 refers to the side of the frame body 1 close to the center of the frame body 1.

As shown in FIGS. 2-9, an aspect of the present disclosure provides a frame, including a frame body 1, which has a first end surface D1 (located on a front side of the frame body 1) and a second end surface D2 (located on a back side of the frame body 1) oppositely disposed. The first end surface D1 is used for mounting a first body portion of a first component, and the frame body 1 is provided with a first opening K1 penetrating from the first end surface D1 to the second end surface D2. The first opening K1 is used to make a driving circuit board of the first component and a first connecting portion pass, the first connecting portion is used for connecting the first body portion with the drive circuit board, and the second end surface D2 of the frame body 1 is provided with an inclined surface X extending outwardly in a direction away from the first end surface D1 from the first opening K1, where the inclined surface X is used for mounting the driving circuit board, as shown in FIGS. 5-9. Here, "extending outwardly" refers to extending toward the outside of the frame body 1. In addition, in order to facilitate the plugging and unplugging operations of other components with the connectors on the drive circuit board, the connector on the driving circuit board may be disposed on a side of the driving circuit board facing away the inclined surface X. The first component may be a liquid crystal screen, the first body portion may be a liquid crystal display panel, and the first connecting portion may be the flexible cable. In this case, the first opening K1 may be a long and narrow via hole, as shown in FIGS. 2-9. In addition, in some embodiments, the frame body 1 is an integrally formed structure, which may increase structural strength and reduce a probability of light leakage due to a softness and insufficient flatness of general middle modules. In addition, since the liquid crystal screen of the display device is generally a rectangular body. Accordingly, in some embodiments, the frame body 1 is a rectangular body, and the first opening K1 is disposed on one side of the rectangular body.

In the above technical solution, the driving circuit board is disposed on the inclined surface X. Compared with a design of turning the driving circuit board to the back of the back plate, the thickness of the product may be reduced. In addition compared with a design of disposing the driving circuit board and the back plate on the same plane, the length of the product may be reduced, that is, the frame of the present application helps to reduce the overall size of the product, and when the first connecting portion is short and cannot be turned over to the back of the back plate, the inclined surface X is disposed to facilitate the mounting of the drive circuit board, and the driving circuit board disposed on the inclined surface X also facilitates the plugging and unplugging operations of other components with the connectors on the drive circuit board.

In some embodiments, an angle between the inclined surface X and a plane where the frame body 1 is located ranges from 10° to 30°. In other words, the angle between the inclined surface X and a surface of the frame body 1 supporting and mounting the first body portion ranges from 10° to 30°. "A plane where the frame body 1 is located" is a plane parallel to the surface of the frame body 1 supporting and mounting the first main body portion and the aforementioned liquid crystal display panel mounted on the frame body 1. In this way, the size of the product may be smaller, and the plugging and unplugging operations of other components with the connectors on the drive circuit board are facilitated.

In order to facilitate the positioning and mounting of the first body portion of the first component, as shown in FIGS. 2 to 4 and 9, in some embodiments, the first end surface D1 is provided with a first annular step H1 for mounting the first body portion of the first component. Also, the first annular step H1 includes a first side wall H11 and a first supporting surface H12 connected to the first side wall H11 and for supporting the first body portion, and the first opening K1 is disposed on the first supporting surface H12. At this time, the first supporting surface H12 is a part of the first end surface D1 or, in other words, the first end surface D1 includes at least the first supporting surface H12.

In addition, in some embodiments, the first end surface D1 is provided with a second annular step H2 for mounting a second body portion of a second component, and the second component may be a functional sheet of a touch screen. As shown in FIGS. 2 to 4 and 9, the second annular step H2 is disposed around an outside of the first annular step H1, and includes a second side wall H21 and a second supporting surface H22 connected to the second side wall and for supporting the second body portion, and an inner peripheral edge of the second supporting surface H22 away from the second side wall H21 is connected to an end of the first side wall H11 away from the first supporting surface H12. At this time, the first supporting surface H12 and the second supporting surface H22 are parts of the first end surface D1, or in other words, the first end surface D1 includes at least the first supporting surface H12 and the second supporting surface H22. In this way, the second component may be stacked and disposed on the first component through the second annular step H2 to ensure smooth assembling.

In addition, in some embodiments, the first end surface D1 is provided with a third annular step H3 for mounting a third component, and the third component may be a cover plate of the touch screen. The third annular step H3 is disposed around an outside of the second annular step H2, and includes a third side wall H31 and a third supporting surface H32 connected to the third side wall and for supporting the third component, and an inner peripheral edge of the third supporting surface H32 away from the third side wall H31 is connected to an end of the second side wall H21 away from the second supporting surface H22. At this time, the first supporting surface H12, the second supporting surface H22, and the third supporting surface H32 are parts of the first end surface D1. In other words, the first end surface D1 includes at least the first supporting surface H12, the second supporting surface H22, and the third supporting surface H32. In this way, the third component may be stacked and disposed on the second component through the third annular step H3 to ensure smooth assembling.

Figure 2:
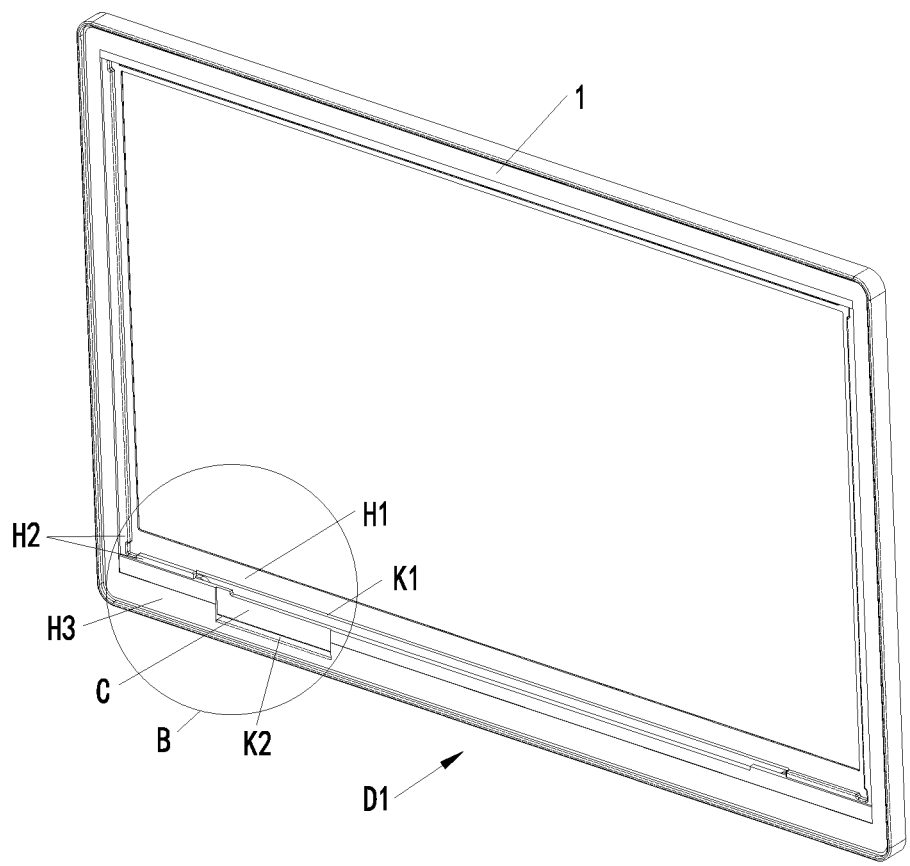
FIG. 2 is a front perspective view of a frame of an embodiment of the present disclosure.
Figure 3:
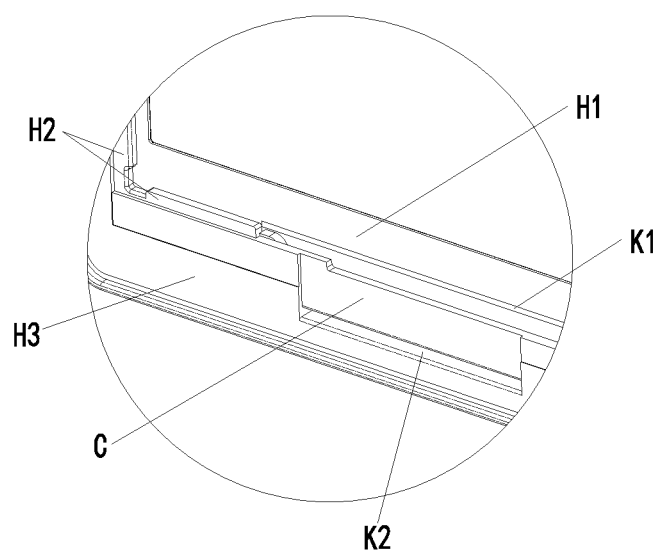
FIG. 3 is an enlarged view of part B in FIG. 2.
Figure 4:
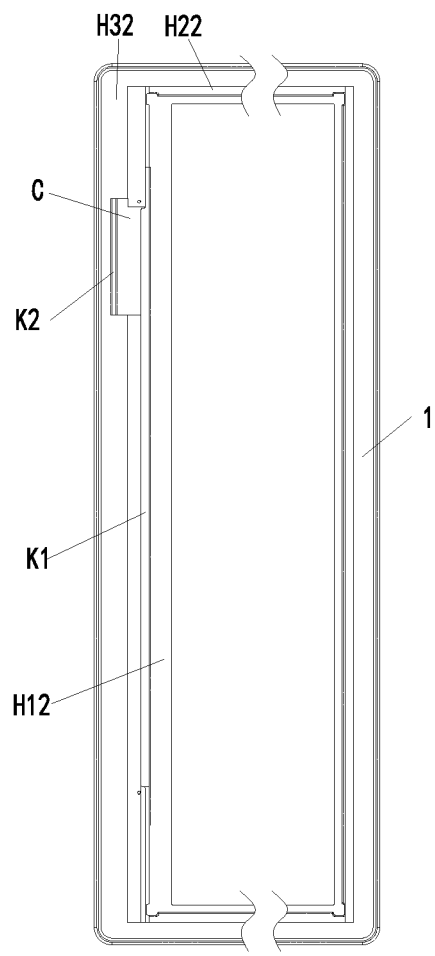
FIG. 4 is a front view of a frame of an embodiment of the present disclosure.
Figure 5:
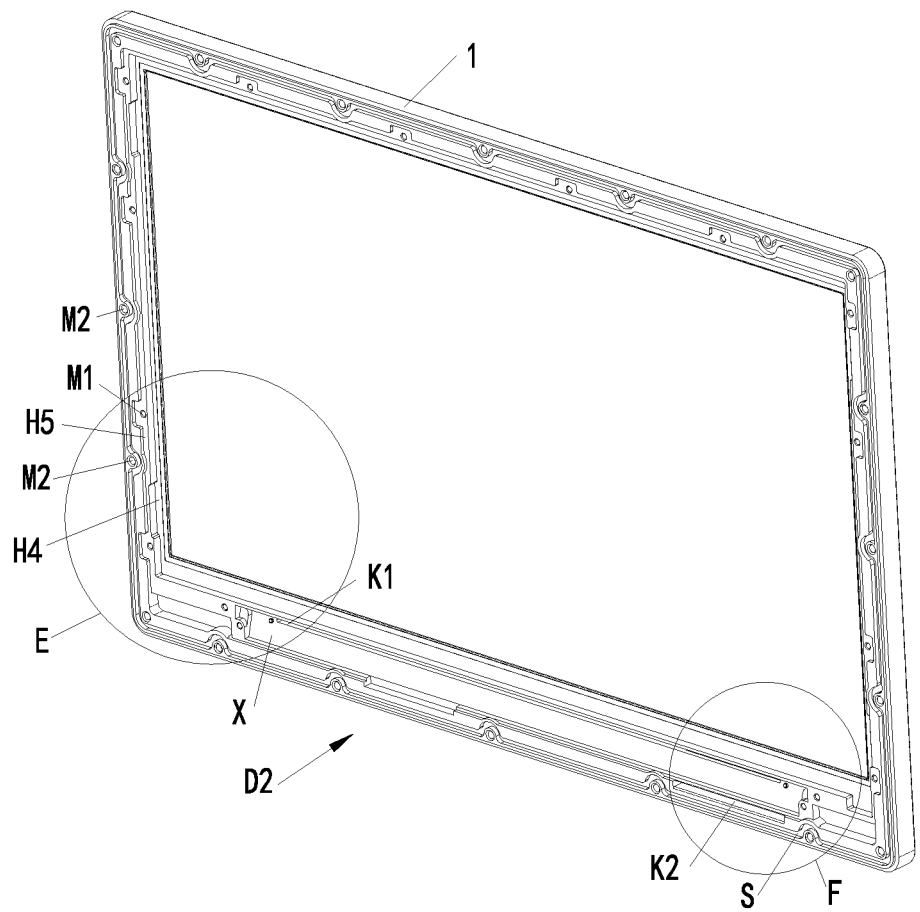
FIG. 5 is a perspective view of a back of a frame of an embodiment of the present disclosure.
Figure 6:
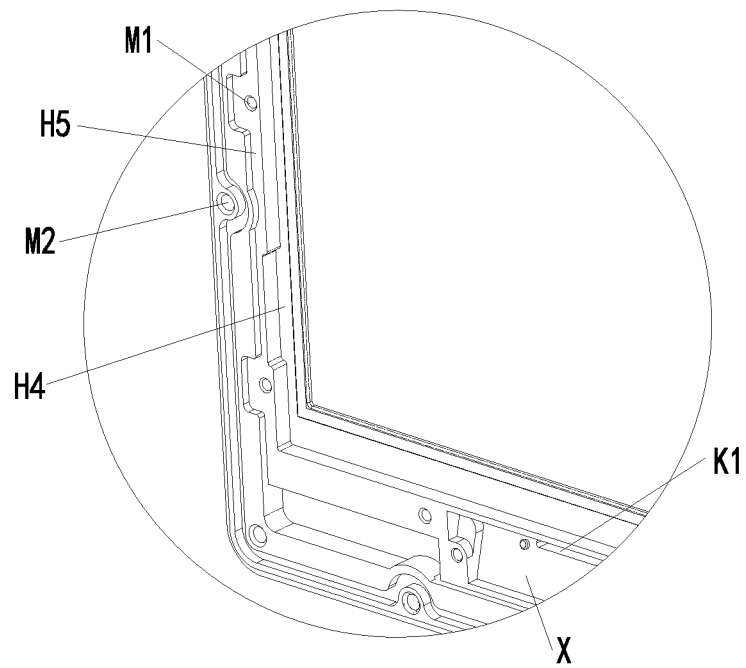
FIG. 6 is an enlarged view of part E in FIG. 5.
Figure 7:
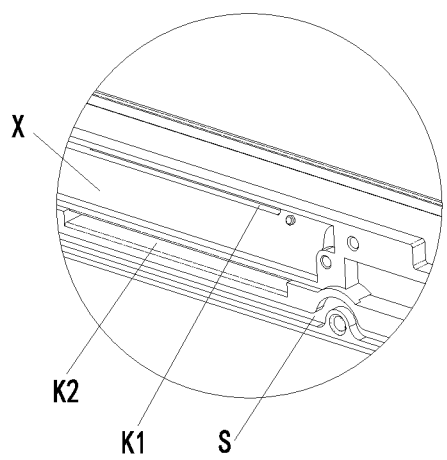
FIG. 7 is an enlarged view of part F in FIG. 5.
Figure 8:
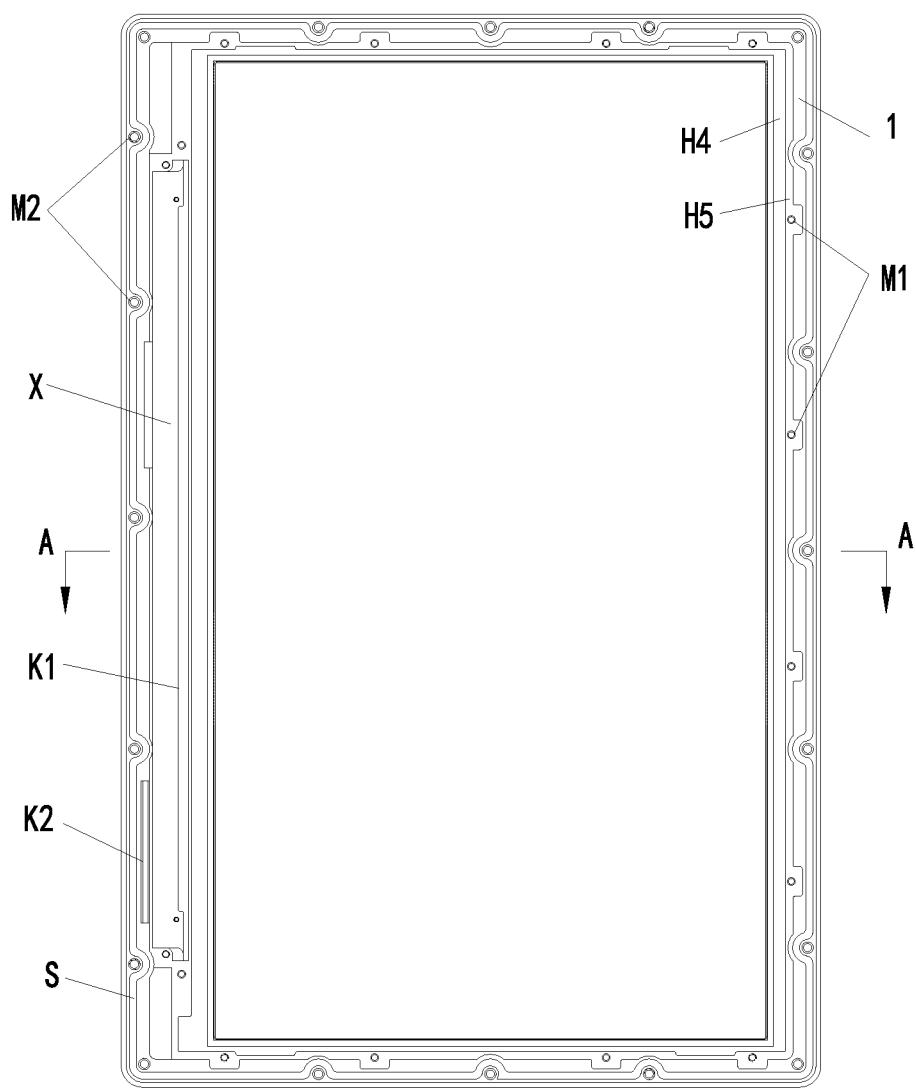
FIG. 8 is a rear view of a frame of an embodiment of the present disclosure.
Figure 9:
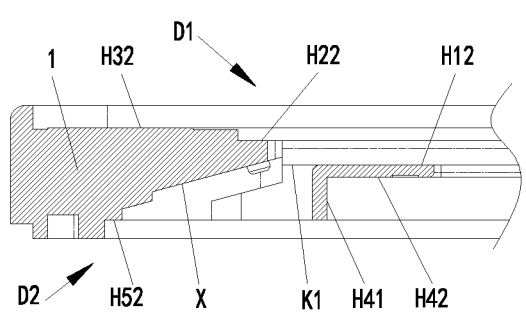
FIG. 9 is an enlarged cross-sectional view along A-A in FIG. 8.
Figure 9:
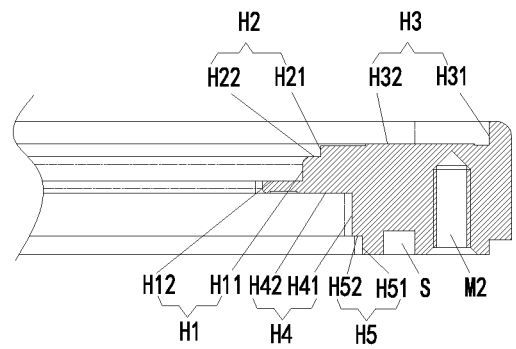

Optionally, in order to facilitate a driving board of the second component and a second connecting portion of the second component connecting the second body portion and the driving board, flip from the front to the back of the frame body 1, as shown in FIGS. 2 to 4, In some embodiments, the third supporting surface H32 is provided with a groove C, and a second opening K2 is disposed at a side of a groove bottom of the groove C close to an outer edge of the frame body 1, and used for a driving board and a second connecting portion of the second component penetrating to the second end surface D2, that is, the driving board and the second connecting portion of the second component penetrate to the second end surface D2 through the second opening K2. The second connecting portion is used for connecting the second body portion and the driving board, and the second opening K2 is located outside of the inclined surface X, which helps to further reduce the size of the product. Specifically, since the second supporting surface H22 of the second annular step H2 generally corresponds to the inclined surface X, in order to avoid that when the second opening K2 is disposed on the second supporting surface H22, the driving board and the second connecting portion mounted through the second opening K2 interferes with the driving circuit board of the first component mounted on the inclined surface X. Therefore, the second opening K2 is disposed corresponding to the third supporting surface H32 of the third annular step H3, and in order to prevent the third component mounted on the third supporting surface H32 from being pressed against the second connecting portion passing through the second opening K2, the third supporting surface H32 is provided with a groove C, and the second opening K2 is disposed at the bottom of the groove C. Of course, the second opening K2 may also be disposed on the second supporting surface H22 if the structures do not interfere with each other.

It should be understood that the components mounted at the first end surface D1 of the frame body 1 may not be limited to the liquid crystal screen and the cover plate and functional sheet of the touch screen, and other components, such as a shielding film, a heating glass, etc., may also be mounted as needed. More steps may be disposed on the first end surface D1, and the step portion may be annular, or not annular or a part of an annular. For example, when the frame body 1 is a rectangular body, the steps may be disposed at two opposite sides of the rectangular body. In addition, if necessary (for example, the drive board needs to be inclined to fit the mounting space or reduce the product size or facilitate the connection of other components with the connector of the drive board, etc.), the inclined surface extending outwardly from the second opening K2 in a direction away from the first end surface D1 may be disposed on the second end surface D2 of the frame body 1.

As shown in FIGS. 5-6 and 8-9, in order to facilitate the positioning and mounting of the optical assembly of the display device, in some embodiments, the second end surface D2 of the frame body 1 is provided with a fourth annular step H4 for mounting the optical assembly of the display device, and the fourth annular step H4 includes a fourth side wall H41 and a fourth supporting surface H42 connected to the fourth side wall H41 and for supporting the optical assembly. At this time, the fourth supporting surface H42 is a part of the second end surface D2, in other words, the second end surface D2 includes at least the fourth supporting surface H42. Further, in some embodiments, in order to facilitate the positioning and mounting of the back plate and the fixed connection of the back plate to the frame body 1, the second end surface D2 of the frame body 1 is provided with a fifth annular step H5 for mounting a back plate of the display device, and the fifth annular step H5 is disposed around an outside of the fourth annular step H4, and includes a fifth side wall H51 and a fifth supporting surface H52 connected to the fifth side wall H51 and for supporting the back plate; an inner peripheral edge of the fifth supporting surface H52 away from the fifth side wall H51 is connected to an end of the fourth side wall H41 away from the fourth supporting surface H42, and the fifth supporting surface H52 is provided with a first mounting hole M1 for mounting a first fastener to fixedly connecting the back plate to the frame body 1. At this time, the fourth supporting surface H42 and the fifth supporting surface H52 are parts of the second end surface D2, or the second end surface D2 includes at least the fourth supporting surface H42 and the fifth supporting surface H52.

In addition, in order to facilitate the sealed mounting of the rear case and the frame body 1 of the display device, as shown in FIGS. 5-9, in some embodiments, the second end surface D2 of the frame body 1 is provided with a ring groove S for mounting a conductive rubber wire. When the frame body 1 is connected to the front and rear cases of the display device, the ring groove S may accommodate the conductive rubber wire disposed between the rear case and the frame body 1, so as to increase the conductive connection between the front and rear cases, thereby improving the shielding performance of the product. Further, in order to facilitate the fixed connection between the rear case and the frame body 1, as shown in FIGS. 5-8, in some embodiments, the second end surface D2 of the frame body 1 is provided with a second mounting hole M2 for mounting a second fastener to fixedly connecting the frame body 1 to a rear case of the display device.

The frame body 1 is provided with the first mounting hole M1 and/or the second mounting hole M2 to facilitate connection with the back plate and/or rear case of the display device, which may effectively reduce the number of parts required to form the entire display device, and helps reduce product weight. In addition, the first fastener and the second fastener may be screws, and the first mounting hole M1 and the second mounting hole M2 may be threaded holes.

In summary, the frame may be used for reinforcing the display device. Specifically, it may be used as the front frame and the middle frame of the display device, that is, it may realize the functions of both the front frame and the middle frame of the conventional module. A notable characteristic of the frame has the inclined surface for mounting the driving circuit board of the LCD screen and the first opening K1 through which the driving circuit board and the flexible cable pass; the annular steps for mounting the cover plate and the functional sheet of the LCD screen and the touch screen; the fourth annular step H4 for mounting the optical assembly (such as the light guiding plate and the optical film). Optionally, the frame has the fifth annular step H5 for mounting the back plate and the first mounting hole M1 connecting to the back plate disposed on the fifth supporting surface H52 of the fifth annular step H5, and further, has the second mounting hole M2 for connecting to the rear case and the ring groove S for mounting the conductive rubber wire to realize the sealing and shielding function.

Figure 10:
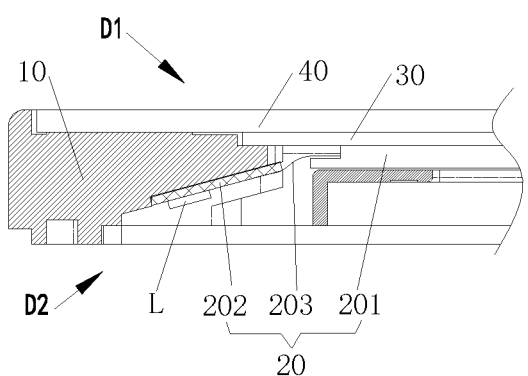
FIG. 10 is a cross-sectional view of a partial structure of a display device according to an embodiment of the present disclosure.
Figure 10:
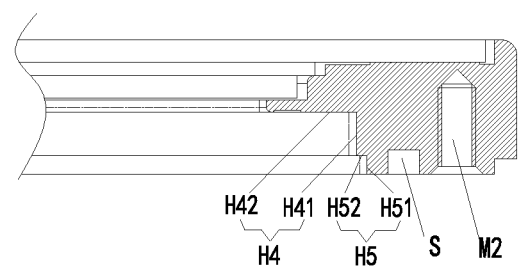

A second aspect of the present disclosure provides a display device, including the above frame 10 and a first component 20. As shown in FIG. 10, the first component 20 includes a first body portion 201, a driving circuit board 202, and a first connecting portion 203 connecting the first body portion 201 and the driving circuit board 202, and the first body portion 201 is mounted at a first end surface D1 of the frame body 1 of the frame 10, the first connecting portion 203 and the driving circuit board 202 pass through a first opening K1 of the frame body 1 and the driving circuit board 202 is mounted on an inclined surface X of the frame body 1. A connector L on the driving circuit board 202 is disposed on the side of the driving circuit board 202 facing away the inclined surface X, which facilitates the plugging and unplugging operations of other components with the connector L on the driving circuit board. In addition, in some embodiments, the first component 20 is a liquid crystal screen, the first body portion 201 is a liquid crystal display panel, and the first connecting portion 203 is a flexible cable. Since the display device includes the aforementioned frame, it has all or at least some of the advantages of the frame.

In order to facilitate the positioning and mounting of the first body portion 201, in some embodiments, the first body portion 201 of the first component 20 is mounted at a first annular step H1 disposed on the first end surface D1.

In some embodiments, the display device further includes a second component 30. In order to facilitate positioning and mounting of the second component 30, the second component 30 is mounted at a second annular step H2 disposed on the first end surface D1 on a side of the first component 20 away from a first supporting surface H12 of the first annular step H1, and the second annular step H2 is disposed around an outside of the first annular step H1, so that the first annular step H1 and the second annular step H2 are disposed in a stepped manner. The second component 30 may be a functional sheet of a touch screen.

In some embodiments, the display device further includes a third component 40 mounted at a third annular step H3 disposed on the first end surface D1 on a side of the second component 30 away from the first component 20, and the third annular step H3 is disposed around an outside of the second annular step H2, so that the third annular step H3 and the second annular step H2 are disposed in a stepped manner. The third component 40 is a cover plate of the touch screen.

It should be understood that the components mounted at the first end surface D1 of the frame body 1 may not be limited to the liquid crystal screen and the cover plate and functional sheet of the touch screen, and other components, such as a shielding film, a heating glass, etc., may also be mounted as needed. In this case, more steps may be disposed on the first end surface D1, and the steps may be ring-shaped, or not ring-shaped or ring-shaped parts. For example, when the frame body 1 is a rectangular body, the steps may only be disposed on the opposite sides of the rectangular body.

In addition, in some embodiments, the display device includes an optical assembly mounted at a fourth annular step H4 disposed on the second end surface D2 of the frame body 1, which facilitates positioning and mounting of the optical assembly. The optical assembly may include a diffuser, a light-enhancing film, a light guiding plate, a LED light bar, and so on. Optionally, the display device includes a back plate and a first fastener, and the back plate is mounted at a fifth annular step H5 disposed on the second end surface D2 of the frame body 1, the back plate is provided with a first fixing hole, and a fifth supporting surface H52 of the fifth annular step H5 is provided with a first mounting hole M1, the first fastener is mounted through the first fixing hole and the first mounting hole M1, thereby fixing the back plate and the frame body 1 together.

Further, in some embodiments, the display device includes a conductive rubber wire mounted in a ring groove S disposed on the second end surface D2 of the frame body 1. When the frame body 1 is connected to the front and rear cases of the display device, the ring groove S may accommodate the conductive rubber wire disposed between the rear case and the frame body 1, so as to increase the conductive connection between the front and rear cases, thereby improving the shielding performance of the product. Optionally, the display device includes a rear case and a second fastener, the rear case is provided with a second fixing hole, and the second fastener is mounted through the second fixing hole and the second mounting hole M2 disposed on the second end surface D2 of the frame body 1, thereby fixing the rear case and the frame body 1 together.

In the above technical solution, the driving circuit board is disposed on the inclined surface. Compared with a design of turning the driving circuit board to the back of the back plate, the thickness of the product may be reduced. When compared with a design where the driving circuit board and the back plate are disposed on the same plane, the length of the product may be reduced. That is, the frame of the present application helps to reduce the overall size of the product, and the driving circuit board is disposed on the inclined surface which facilitates the mounting of the driving circuit board when the first connecting portion is short, and the driving circuit board disposed on the inclined surface X also facilitates the plugging and unplugging operations of other components with the connectors on the drive circuit board.

In addition, although exemplary embodiments have been described herein, their scope includes any and all embodiments based on this disclosure which have equivalent elements, or are modified, omitted, combined (e.g., a scheme in which various embodiments intersect), adapted or changed. An element in the claims will be explained broadly based on the language adopted in the claims, and will not be limited to examples described in this specification or during the implementation of this application, and its examples will be interpreted as non-exclusive. Therefore, this specification and the examples are intended to be regarded as examples only. The true scope and spirit are indicated by the following claims and the full scope of their equivalents.

The above description is intended to be illustrative rather than restrictive. For example, the above examples (or one or more scheme thereof) may be used in combination with one another. For example, the person having ordinary skills in the art may use other embodiments when reading the above description. In addition, in the above specific implementations, various features may be grouped together to simplify this disclosure. This should not be interpreted as an intention that a disclosed feature which is not claimed is necessary for any claim. On the contrary, the subject matter of this disclosure may be less than all features of a specific disclosed embodiment. Therefore, the following claims are incorporated into detailed description as examples or embodiments, wherein each of the claims acts as a separate embodiment independently, and it is considered that these embodiments may be combined with one another in various combinations or arrangements. The scope of this disclosure should be determined with reference to the full scope of the appended claims and equivalent forms entitled by the claims.

The above embodiments are just exemplary embodiments of this disclosure, not used for limiting this disclosure, and the protection scope of this disclosure is defined by the claims. The person having skills in the art may make various modifications or equivalent substitutions to this disclosure within the essence and protection scope of this disclosure, and the modifications or equivalent substitutions should also be deemed to fall within the protection scope of this disclosure.

What is claimed is:

1. A display module, comprising:
a frame and a first component, wherein the first component comprises a first body portion and a first connection portion connecting the first body portion, and a driving circuit board,
wherein the frame comprises a frame body having a first end surface configured to mount the first body portion of the first component and a second end surface disposed oppositely,
wherein the frame body is provided with a first opening penetrating from the first end surface to the second end surface that is configured for the driving circuit board and the first connecting portion to pass through, and the second end surface of the frame body is provided with an inclined surface extending outwardly in a direction away from the first end surface from the first opening and configurated to mount the driving circuit board of the first component.

2. The display module according to claim 1, wherein an angle between the inclined surface and a plane where the frame body is located ranges from 10° to 30°.

3. The display module according to claim 1, wherein the first end surface is provided with a first annular step comprising a first side wall and a first supporting surface connected to the first side wall and for supporting a first body portion, and the first opening is disposed on the first supporting surface.

4. The display module according to claim 3, wherein the first end surface is provided with a second annular step disposed around an outside of the first annular step, and the second annular step comprises a second side wall and a second supporting surface connected to the second side wall, and an inner peripheral edge of the second supporting surface away from the second side wall is connected to an end of the first side wall away from the first supporting surface.

5. The display module according to claim 4, wherein the first end surface is provided with a third annular step disposed around an outside of the second annular step, and the third annular step comprises a third side wall and a third supporting surface connected to the third side wall, and an inner peripheral edge of the third supporting surface away from the third side wall is connected to an end of the second side wall away from the second supporting surface.

6. The display module according to claim 5, wherein the third supporting surface is provided with a groove, and a second opening is disposed at a side of a groove bottom of the groove close to an outer edge of the frame body, and located outside of the inclined surface.

7. The display module according to claim 1, wherein:
the second end surface of the frame body is provided with a fourth annular step comprising a fourth side wall and a fourth supporting surface connected to the side wall; and
the second end surface of the frame body is provided with a fifth annular step disposed around an outside of the fourth annular step, the fifth annular step comprises a fifth side wall and a fifth supporting surface connected to the fifth side wall, and an inner peripheral edge of the fifth supporting surface away from the fifth side wall is connected to an end of the fourth side wall away from the fourth supporting surface, and the fifth supporting surface is provided with a first mounting hole.

8. The display module according to claim 1, wherein the second end surface of the frame body is provided with a ring groove.

9. The display module according to claim 1, wherein the second end surface of the frame body is provided with a second mounting hole.

10. The display module according to claim 1, wherein the frame body is an integrally formed structure.

11. The display module according to claim 1, wherein: the frame body is a rectangular body, and the first opening is provided on one side of the rectangular body.

12. A display device, comprising:
a frame comprising a frame body having a first end surface and a second end surface disposed oppositely, wherein the frame body is provided with a first opening penetrating from the first end surface to the second end surface, and the second end surface of the frame body is provided with an inclined surface extending outwardly in a direction away from the first end surface from the first opening; and
a first component, comprising a first body portion, a driving circuit board, and a first connecting portion connecting the first body portion and the driving circuit board, wherein the first body portion is mounted at the first end surface of the frame body of the frame, the first connecting portion and the driving circuit board pass through the first opening of the frame body and the driving circuit board is mounted on the inclined surface of the frame body.

13. The display device according to claim 12, wherein the first component is a liquid crystal screen, the first body portion is a liquid crystal display panel, and the first connecting portion is a flexible cable.

14. The display device according to claim 12, wherein:
the first end surface is provided with a first annular step comprising a first side wall and a first supporting surface connected to the first side wall and for supporting a first body portion; the first opening is disposed on the first supporting surface; and
the first body portion of the first component is mounted at the first annular step disposed on the first end surface.

15. The display device according to claim 14, wherein:
the first end surface is provided with a second annular step disposed around an outside of the first annular step, and the second annular step comprises a second side wall and a second supporting surface connected to the second side wall;
an inner peripheral edge of the second supporting surface away from the second side wall is connected to an end of the first side wall away from the first supporting surface;
the display device further comprises a second component mounted at the second annular step disposed on the first end surface on a side of the first component away from the first supporting surface of the first annular step, and the second annular step is disposed around an outside of the first annular step; and
the second component is a functional sheet of a touch screen.

16. The display device according to claim 15, wherein:
the first end surface is provided with a third annular step disposed around an outside of the second annular step, and the third annular step comprises a third side wall and a third supporting surface connected to the third side wall;

an inner peripheral edge of the third supporting surface away from the third side wall is connected to an end of the second side wall away from the second supporting surface;

the display device further comprises a third component mounted at the third annular step disposed on the first end surface on a side of the second component away from the first component, and the third annular step is disposed around an outside of the second annular step; and the third component is a cover plate of the touch screen.

17. The display device according to claim 12, comprising wherein:

the second end surface of the frame body is provided with a fourth annular step comprising a fourth side wall and a fourth supporting surface connected to the side wall; and the display device comprises an optical assembly mounted at the fourth annular step disposed on the second end surface of the frame body.

18. The display device according to claim 17, wherein:

the second end surface of the frame body is provided with a fifth annular step disposed around an outside of the fourth annular step, the fifth annular step comprises a fifth side wall and a fifth supporting surface connected to the fifth side wall, and an inner peripheral edge of the fifth supporting surface away from the fifth side wall is connected to an end of the fourth side wall away from the fourth supporting surface;

the fifth supporting surface is provided with a first mounting hole; and the display device comprises a back plate and a first fastener, wherein the back plate is mounted at the fifth annular step disposed on the second end surface of the frame body, the back plate is provided with a first fixing hole, the fifth supporting surface of the fifth annular step is provided with the first mounting hole, and the first fastener is mounted through the first fixing hole and the first mounting hole.

19. The display device according to claim 12, further comprising a conductive rubber wire mounted in a ring groove disposed on the second end surface of the frame body.

20. The display device according to claim 12, further comprising a rear case and a second fastener, wherein the rear case is provided with a second fixing hole, and the second fastener is mounted through the second fixing hole and a second mounting hole disposed on the second end surface of the frame body.

* * * * *